US011316801B2

(12) United States Patent
Bhardwaj et al.

(10) Patent No.: US 11,316,801 B2
(45) Date of Patent: Apr. 26, 2022

(54) FLEXIBLE TRAFFIC CONTROL FOR EVPN

(71) Applicant: Ciena Corporation, Hanover, MD (US)

(72) Inventors: Jayant Kumar Bhardwaj, New Delhi (IN); Himanshu Shah, Hopkinton, MA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/036,349

(22) Filed: Sep. 29, 2020

(65) Prior Publication Data
US 2022/0052964 A1 Feb. 17, 2022

(30) Foreign Application Priority Data
Aug. 14, 2020 (IN) .............................. 202011035098

(51) Int. Cl.
*H04L 49/25* (2022.01)
*H04L 12/46* (2006.01)
(Continued)

(52) U.S. Cl.
CPC .......... *H04L 49/25* (2013.01); *H04L 12/4633* (2013.01); *H04L 12/4641* (2013.01); *H04L 45/74* (2013.01); *H04L 47/24* (2013.01); *H04L 61/20* (2013.01); *H04L 69/325* (2013.01); *H04L 61/6022* (2013.01)

(58) Field of Classification Search
CPC ..... H04L 49/25; H04L 49/256; H04L 49/351; H04L 49/30; H04L 12/28; H04L 12/46; H04L 12/4633; H04L 12/4641; H04L 12/66; H04L 45/16; H04L 45/24; H04L 45/50; H04L 45/66; H04L 45/74; H04L 45/745; H04L 69/324; H04L 69/325; H04L 47/24; H04L 47/2408; H04L 47/2416; H04L 47/2441; H04L 47/2483;
(Continued)

(56) References Cited

U.S. PATENT DOCUMENTS 8,259,590 B2 9/2012 Shah et al.
8,295,278 B2 10/2012 Shah et al.
(Continued)

OTHER PUBLICATIONS

Rekhter, et al., "A Border Gateway Protocol 4 (BGP-4)," Network Working Group, Category: Standards Track, Jan. 2006, pp. 1-104.
(Continued)

*Primary Examiner* — Peter Chen
(74) *Attorney, Agent, or Firm* — Clements Bernard Baratta; Lawrence A. Baratta, Jr.; Christopher L. Bernard

(57) ABSTRACT

Systems and methods include receiving one or more Ethernet Virtual Private Network (EVPN) advertisements from one or more peer nodes with information including any of traffic characterization information and traffic control information; and providing traffic to the EVPN and to the corresponding one or more peer nodes based on the information from the corresponding one or more peer nodes. The one or more EVPN advertisements can be in an EVPN Network Layer Reachability Information (NLRI) advertisement, and the EVPN NLRI can have Route Type 1 for the information to apply to an EVPN Instance (EVI) and the EVPN NLRI can have Route Type 2 for the information to apply to a specific customer node based on a Media Access Control (MAC).

9 Claims, 6 Drawing Sheets

(51) Int. Cl.
*H04L 61/50* (2022.01)
*H04L 45/74* (2022.01)
*H04L 47/24* (2022.01)
*H04L 69/325* (2022.01)
*H04L 101/622* (2022.01)

(58) Field of Classification Search
CPC . H04L 61/20; H04L 61/6018; H04L 61/6022; H04L 61/6059; H04L 61/6063
See application file for complete search history.

(56) References Cited

U.S. PATENT DOCUMENTS

| | | | |
|---|---|---|---|
| 10,015,066 | B2 | 7/2018 | Mishra et al. |
| 10,291,532 | B1* | 5/2019 | Tiruveedhula ........ H04L 47/125 |
| 2018/0331953 | A1* | 11/2018 | Hoang .................... H04L 45/66 |
| 2020/0014585 | A1 | 1/2020 | Agarwal et al. |
| 2020/0177500 | A1 | 6/2020 | Agarwal et al. |
| 2021/0119911 | A1* | 4/2021 | Zhao ................... H04L 12/4625 |
| 2021/0203586 | A1* | 7/2021 | Liu ....................... H04L 45/566 |

OTHER PUBLICATIONS

Bates et al., "Multiprotocol Extensions for BGP-4," Network Working Group, Category: Standards Track, Jan. 2007, pp. 1-12.
Sajassi et al., "Requirements for Ethernet VPN (EVPN)," Internet Engineering Task Force (IETF), Category: Informational, ISSN: 2070-1721, May 2014, pp. 1-15.
Sajassi et al., "BGP MPLS-Based Ethernet VPN," Internet Engineering Task Force (IETF), Category: Standards Track, ISSN: 2070-1721, Feb. 2015, pp. 1-56.
Boutros et al., "Virtual Private Wire Service Support in Ethernet VPN," Internet Engineering Task Force (IETF), Category: Standards Track, ISSN: 2070-1721, pp. 1-17.
Sajassi et al., "A Network Virtualization Overlay Solution Using Ethernet VPN (EVPN)," Internet Engineering Task Force (IETF), Category: Standards Track, ISSN: 2070-1721, Mar. 2018, pp. 1-33.

* cited by examiner

```
                     ,-30
                    /
 0                   1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|Reserved      |     flags               |       TC      |  DP  |
+-+-+-+-+-+-+-+-+-+-+-+-+-+-+-+-+-+-+-+-+-+-+-+-+-+-+-+-+-+-+-+-+
|               Committed Information Rate (CIR)                |
+-+-+-+-+-+-+-+-+-+-+-+-+-+-+-+-+-+-+-+-+-+-+-+-+-+-+-+-+-+-+-+-+
|                Excess Information Rate (EIR)                  |
+-+-+-+-+-+-+-+-+-+-+-+-+-+-+-+-+-+-+-+-+-+-+-+-+-+-+-+-+-+-+-+-+
|                 Committed Burst Size (CBS)                    |
+-+-+-+-+-+-+-+-+-+-+-+-+-+-+-+-+-+-+-+-+-+-+-+-+-+-+-+-+-+-+-+-+
|                   Excess Burst Size (EBS)                     |
+-+-+-+-+-+-+-+-+-+-+-+-+-+-+-+-+-+-+-+-+-+-+-+-+-+-+-+-+-+-+-+-+ flags
00000000000 No Information Present.
00000000001 CIR/EIR Valid.
00000000010 TC/DP Valid.
00000000011 CIR/EIR/CBS/EBS/TC/DP is valid.

TC
              0-7 : Traffic Class

DP  : Drop Precedence
              000 : Green
              001 : Yellow
              010 : Red
              011 : Black
```

*FIG. 2*

FLEXIBLE TRAFFIC CONTROL FOR EVPN

FIELD OF THE DISCLOSURE

The present disclosure generally relates to networking. More particularly, the present disclosure relates to systems and methods for flexible traffic control for Ethernet Virtual Private Network (EVPN).

BACKGROUND OF THE DISCLOSURE

EVPN is an emerging technology that provides a wider set of features covering Layer 2 (L2)-Virtual Private LAN (Local Area Network) (L2VPN) and Layer 3 (L3)-Virtual Private LAN (L3VPN). EVPN is a service overlay that provides VPN connectivity for point-to-point or multipoint Ethernet services. It relies on signaling locally learned client Media Access Control (MAC) addresses between Border Gateway Protocol (BGP) peers and utilizes multiple underlying transport to carry the service traffic across the network. The EVPN provides various other benefits above traditional L2VPN (VPLS), which is based on data plane-based learning and have no control plane options. EVPN is described, e.g., in RFC 7209, "Requirements for Ethernet VPN (EVPN)," May 2014, RFC 7432, "BGP MPLS-Based Ethernet VPN," February 2015, RFC 8214, "Virtual Private Wire Support in Ethernet VPN," August 2017, and RFC 8365, "A Network Virtualization Overlay Solution Using Ethernet VPN (EVPN)," March 2018, the contents of each are incorporated by reference. EVPN uses Border Gateway Protocol (BGP) signaling to establish the EVPN instance (EVI) with BGP Peers to offer a multipoint-to-multipoint L2 Ethernet service for a given client. EVPN relies on learning the Internet Protocol (IP) and Media Access Control (MAC) address binding of the locally connected Customer Edges (CEs) and distributing this information in the BGP EVPN Protocol Data Units (PDUs) to remote Provider Edges (PEs) that are members of the established EVPN instance.

One disadvantage of EVN is that there is no ability to dynamically control traffic for an EVPN instance or for a MAC within an EVPN instance. Each sending PE makes local decisions for controlling traffic by static provisioning on each tunnel.

BRIEF SUMMARY OF THE DISCLOSURE

The present disclosure relates to systems and methods for flexible traffic control for Ethernet Virtual Private Network (EVPN) from remote peers. The present disclosure includes a new optional transitive BGP attribute that provides traffic characterization and control information for a whole EVI Instance on a PE or for specific CE (MAC) of an EVPN Instance. As such, an operator has the option to flexibly control traffic of a specific EVI, arriving on a PE from other PEs, or to flexibly control traffic of a CE device (MAC) in an EVI arriving on a PE from other PEs. The approach described herein only needs configuration at a single node, and the traffic control can be distributed and applied to all peer PEs which are part of the same EVI. Also, the approach described herein can use an optional BGP attribute, so the devices which do not support it shall gracefully ignore this attribute. Accordingly, there are no interworking issues with other devices. Advantageously, the flexible traffic control provides an operator granular control of EVPN traffic. For example, an operator can manage and dynamically control low cost and high-cost customers within the same EVPN (EVI) and generate justified revenue on specific PE levels. Also, this could allow lower-end devices (e.g., smaller devices) to deploy an EVPN effectively. For example, this could allow Distributed Network Function Virtualization Infrastructure (DNFVI) based solutions, which may be part of EVPN Instance but may not be ready to handle high traffic and may need dynamic traffic management on various levels in EVPN.

In an embodiment, a node includes a plurality of ports connected to one or more customer nodes and to one or more peer nodes; a switching fabric configured to switch traffic between the plurality of ports; and a controller configured to obtain one or more Ethernet Virtual Private Network (EVPN) advertisements from the one or more peer nodes with information including any of traffic characterization information and traffic control information, and cause transmission of the traffic to the EVPN and to the corresponding one or more peer nodes based on the information from the corresponding one or more peer nodes. The one or more EVPN advertisements can be in an EVPN Network Layer Reachability Information (NLRI) advertisement with Route Type 1, and wherein the information can be applied to an EVPN Instance (EVI) associated with the EVPN NLRI advertisement. The one or more EVPN advertisements can be in an EVPN Network Layer Reachability Information (NLRI) advertisement with Route Type 2, and wherein the information can be applied to a specific customer node based on a Media Access Control (MAC) address associated with the EVPN NLRI advertisement. The one or more EVPN advertisements can be in an EVPN Network Layer Reachability Information (NLRI) advertisement, and wherein the EVPN NLRI can have Route Type 1 for the information to apply to an EVPN Instance (EVI) and the EVPN NLRI can have Route Type 2 for the information to apply to a specific customer node based on a Media Access Control (MAC). The one or more EVPN advertisements can be in an optional Border Gateway Protocol (BGP) attribute. The traffic characterization information can include any of Committed Information Rate (CIR), Excess Information Rate (EIR), and Committed Burst Size (CBS). The traffic control information can include any of Traffic Class and Drop Precedence.

In additional embodiments, the present disclosure includes a method having steps and a non-transitory computer-readable medium having instructions stored thereon for programming a node to perform steps. The steps include receiving one or more Ethernet Virtual Private Network (EVPN) advertisements from one or more peer nodes with information including any of traffic characterization information and traffic control information; and providing traffic to the EVPN and to the corresponding one or more peer nodes based on the information from the corresponding one or more peer nodes. The one or more EVPN advertisements can be in an EVPN Network Layer Reachability Information (NLRI) advertisement with Route Type 1, and wherein the information can be applied to an EVPN Instance (EVI) associated with the EVPN NLRI advertisement. The one or more EVPN advertisements can be in an EVPN Network Layer Reachability Information (NLRI) advertisement with Route Type 2, and wherein the information can be applied to a specific customer node based on a Media Access Control (MAC) address associated with the EVPN NLRI advertisement. The one or more EVPN advertisements can be in an EVPN Network Layer Reachability Information (NLRI) advertisement, and wherein the EVPN NLRI can have Route Type 1 for the information to apply to an EVPN Instance (EVI) and the EVPN NLRI can have Route Type 2 for the information to apply to a specific customer node based on a Media Access Control (MAC). The one or more EVPN advertisements can be in an optional Border Gateway Protocol (BGP) attribute. The traffic characterization information can include any of Committed Information Rate (CIR), Excess Information Rate (EIR), and Committed Burst Size (CBS). The traffic control information can include any of Traffic Class and Drop Precedence.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a diagram of an example implementation of a BGP traffic control attribute;

DETAILED DESCRIPTION OF THE DISCLOSURE

Again, the present disclosure relates to systems and methods for flexible traffic control for Ethernet Virtual Private Network (EVPN) from remote peers. The present disclosure includes a new optional transitive BGP attribute that provides traffic characterization and control information for a whole EVI Instance on a PE or for specific CE (MAC) of an EVPN Instance. As such, an operator has the option to flexibly control traffic of a specific EVI, arriving on a PE from other PEs, or to flexibly control traffic directed to a CE device (MAC) in an EVI arriving on a PE from other PEs. The approach described herein only needs configuration at a single node, and the traffic control can be distributed and applied to all peer PEs which are part of the same EVI. Also, the approach described herein can use an optional BGP attribute, so the devices which do not support it shall gracefully ignore this attribute. Accordingly, there are no interworking issues with other devices. Advantageously, the flexible traffic control provides an operator granular control of EVPN traffic. For example, an operator can manage and dynamically control low cost and high-cost customers within the same EVPN (EVI) and generate justified revenue on specific PE levels. Also, this could allow lower-end devices (e.g., smaller devices) to deploy an EVPN effectively. For example, this could allow Distributed Network Function Virtualization Infrastructure (DNFVI) based solutions, which may be part of EVPN Instance but may not be ready to handle high traffic and may need dynamic traffic management on various levels in EVPN.

Acronyms

The following acronyms are utilized herein:

| | |
|---|---|
| BGP-LU | Border Gateway Protocol Labeled Unicast |
| CE | Customer Edge |
| DNFVI | Distributed Network Function Virtualization Infrastructure |
| DP | Drop Precedence |
| EAD/EVI | Ethernet Auto-Discovery Route per EVI |
| ESI | Ethernet Segment Identifier |
| EVPN | Ethernet VPN |
| EVI | Ethernet VPN Instance |
| IP | Internet Protocol |
| LAN | Local Area Network |
| L2VPN | Layer 2 VPN |
| L3VPN | Layer 3 VPN |
| MAC | Media Access Control |
| MPLS | Multiprotocol Label Switching |
| NLRI | Network Layer Reachability Information |
| PE | Provider Edge |
| SR | Segment Routing |
| TC | Traffic Class |
| VLAN | Virtual Local Area Network |
| VPLS | Virtual Private LAN Service |
| VPN | Virtual Private Network |

EVPN

Again, EVPN is an emerging technology to provide a wider set of features covering L2VPN and L3 VPN. EVPN is a service overlay that provides VPN connectivity for point-to-point or multipoint Ethernet services. It relies on signaling locally learned client MAC addresses between the BGP peers and utilizes multiple underlying transport to carry service traffic across the network. The EVPN provides various other benefits above traditional L2VPN (VPLS), which is based on data plane-based learning and have no control plane options.

Figure 1:
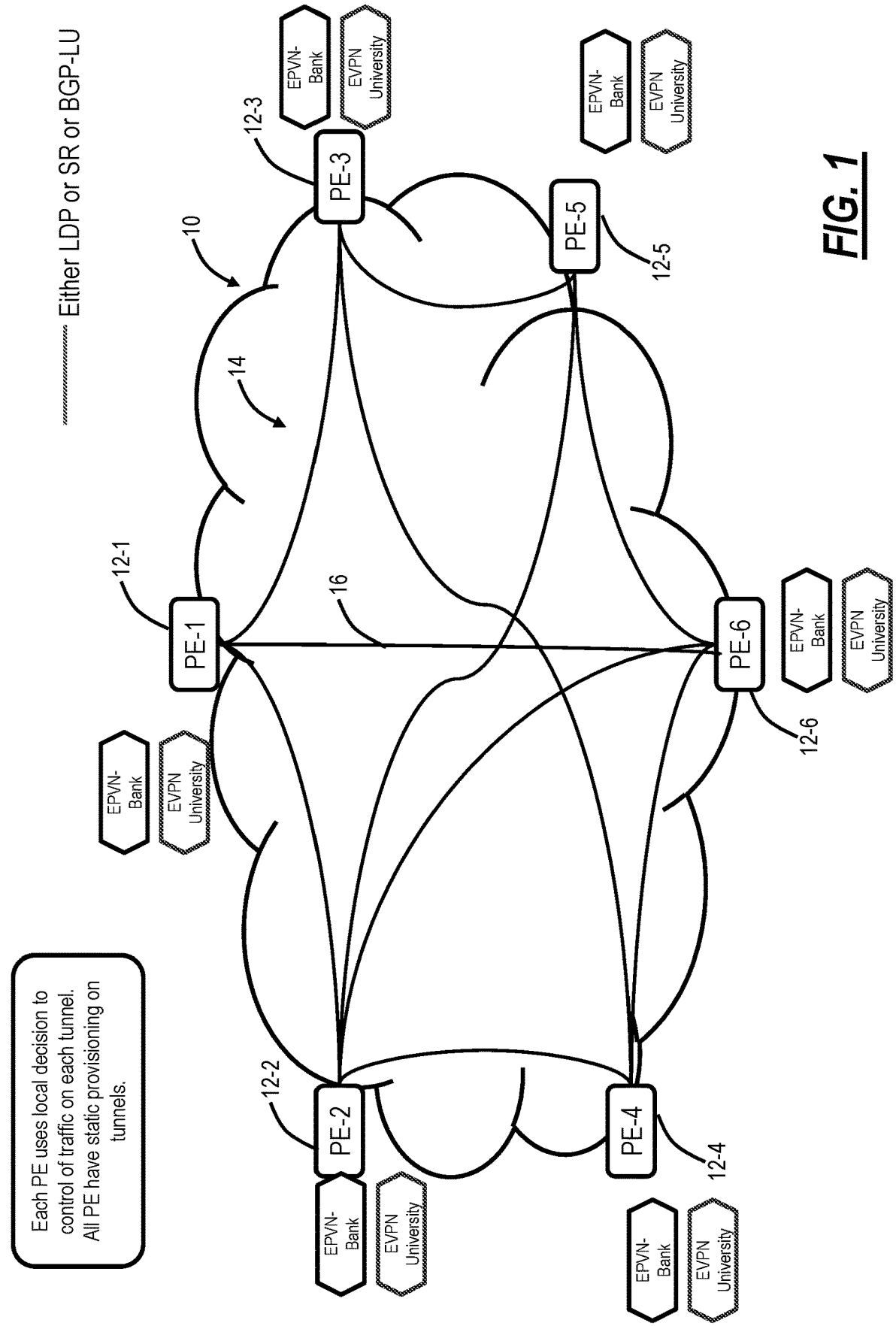
FIG. 1 is a network diagram of a network of multiple PEs interconnected in an EVPN.

FIG. 1 is a network diagram of a network 10 of multiple PEs 12 (labeled PEs 12-1 to 12-6) interconnected in an EVPN 14. In this example of the EVPN 14, each of the PEs 12 are connected to one another via links 16. Again, the EVPN 14 is a service overlay and the links 16 can be based on a protocol such as MPLS, SR, BGP-LU, etc. Also, those skilled in the art will recognize the EVPN 14 could have some of the PEs 12 unconnected to one another, as well as a simple point-to-point between two PEs 12. Stated differently, FIG. 1 is presented as an example for the EVPN 14, and the EVPN 14 can be point-to-point or multipoint, and the multipoint does not necessarily require a full mesh interconnect of all PEs 12.

The EVPN 14 includes two example customers, labeled as EVPN-bank and EVPN-university. In FIG. 1, conventionally, there is no dynamic control of traffic for the customers either at the EVPN level or individual MAC level. Each of the PEs 12 makes a local decision to control traffic on each tunnel, and all of the PEs 12 have static provisioning on the tunnels. As described herein, the tunnels are provisioned for the EVPN 14 on the links 16. In the example of FIG. 1, there is a tunnel between each and every PE 12.

RFC 7432 defines a new BGP NLRI referred to as the EVPN NLRI. The EVPN NLRI includes a Route Type field (1 octet), a length field (1 octet), and a Route Type specific field (variable length). The Route Type defines the encoding of the rest of the EVPN. RFC 7432 defines the following Route Types:

| | |
|---|---|
| +1 | Ethernet Auto-Discovery (A-D) route |
| +2 | MAC/IP Advertisement route |
| +3 | Inclusive Multicast Ethernet Tag route |
| +4 | Ethernet Segment route |

The EVPN NLRI is carried in BGP [described in RFC 4271, "A Border Gateway Protocol 4 (BGP-4)," January 2006, the contents of which are incorporated by reference] using BGP Multiprotocol Extensions [described in RFC 4760, "Multiprotocol Extensions for BGP-4," January 2007, the contents of which are incorporated by reference] with an Address Family Identifier (AFI) of 25 (L2VPN) and a Subsequent Address Family Identifier (SAFI) of 70 (EVPN). The NLRI field in the MP_REACH_NLRI/MP_UN-REACH_NLRI attribute contains the EVPN NLRI (encoded as specified above).

The EVPN Route Type-1 is used for EAD/EVI by a PE 12 to inform about the EVI instance on this PE 12. The EVPN Route Type-2 is used by a PE 12 to advertise a specific MAC address (learned locally from CEs attached) to other PEs 12 within that EVI. Note that EVPN Route Type-2 not used when the EVPN instance is of type point-to-point (RFC 8214).

Flexible Control of Traffic in the EVPN

The present disclosure includes an approach for flexible control of traffic in the EVPN 14 where a particular PE 12, e.g., the PE 12-1, can control traffic on the EVPN 14 based on information from remote peers, e.g., the PEs 12-2 to 12-6. In particular, the present disclosure includes a new optional transitive BGP attribute that provides the traffic characterization and control information for whole EVI Instance on a PE or for specific CE (MAC) of an EVPN Instance. That is, traffic control is performed at network ingress by each PE 12. The present disclosure includes a new traffic characterization and control BGP attribute that is provided from peer PEs 12, and a local PE 12 can use this information for traffic policing, traffic shaping, etc. First, the traffic characterization and control information can be used for a PE 12 to advertise the proposed attribute in EVPN Route Type-1 to request other PEs 12 apply the specified traffic control information when they send traffic to this PE 12 for the whole EVI. Second, the proposed BGP attribute can be advertised in the EVPN Route Type-2 by a PE 12, to apply the specific traffic control information to a specific MAC address (when other PEs 12 send traffic the packets destined to this MAC) in a specific EVI.

FIG. 2 is a diagram of an example implementation of a BGP traffic control attribute 30. The BGP traffic control attribute can be an optional non-transitive BGP attribute that may be recognized by some BGP speakers, but not all (the PEs 12 are BGP speakers). The BGP traffic control attribute 30 can be added to an EVPN Route Type-1 NLRI advertisement to specify traffic characterization and control for a whole EVI. The BGP traffic control attribute 30 can be added to an EVPN Route Type-2 NLRI advertisement to specify traffic characterization and control for a specific MAC address in a specific EVI.

As described herein, the traffic characterization and control information in the BGP traffic control attribute 30 can include any actionable information for a local PE 12 to perform traffic policing and/or traffic shaping, on a per EVI and/or per MAC per EVI basis. In an embodiment, the BGP traffic control attribute 30 includes flags, a Traffic Class (TC), Drop Precedence (DP), Committed Information Rate (CIR), Excess Information Rate (EIR), Committed Burst Size (CBS), and/or Excess Burst Size (EBS). The TC, DP, CIR, EIR, CBS, and EBS can be used by a PE 12, as is known in the art for traffic shaping and policing. The flags section is used to indicate what information is present in the rest of the BGP traffic control attribute 30.

Advantageously, the present disclosure helps network operators control the traffic for the EVPN 14 dynamically and granularly. The network operator can set these parameters so that from each PE Peer, the traffic is as per defined traffic control parameters for the complete EVI. This way operator can control traffic between multiple EVIs arriving on that PE 12. The network operator can set these parameters so that from each PE Peer, the specific MAC destined traffic is per defined traffic parameters. This way operator can manage and control traffic among CEs of an EVI on that PE 12.

Note that there can be multiple other use cases possible. For example, the network operator may only set TC and DP of a specific MAC. The network operator may mark all traffic of an EVI as Yellow. Or treat all traffic destined to an EVI or to a specific MAC as Best Effort. There are multiple controls possible now. The local PE 12 can utilize the same scheme for a given EVI or for a given CE MAC in an EVI to throttle traffic from a sending remote PE 12, based on congestion observed when multiple remote PE 12 are sending the traffic simultaneously. By providing updated traffic control to remote PE 12, local congestion and/or traffic drops are managed with the added advantage of not consuming network bandwidth, only to be discarded upon arrival.

Also, there are Quality of Service (QoS) controls possible in underlying transport (Tunnels), but these QoS controls are not possible to be dynamically controlled by a remote PE 12 and not possible to be controlled on EVI or on a specific MAC level.

Use Case—Traffic Control for a Whole EVI for a PE

Figure 3:
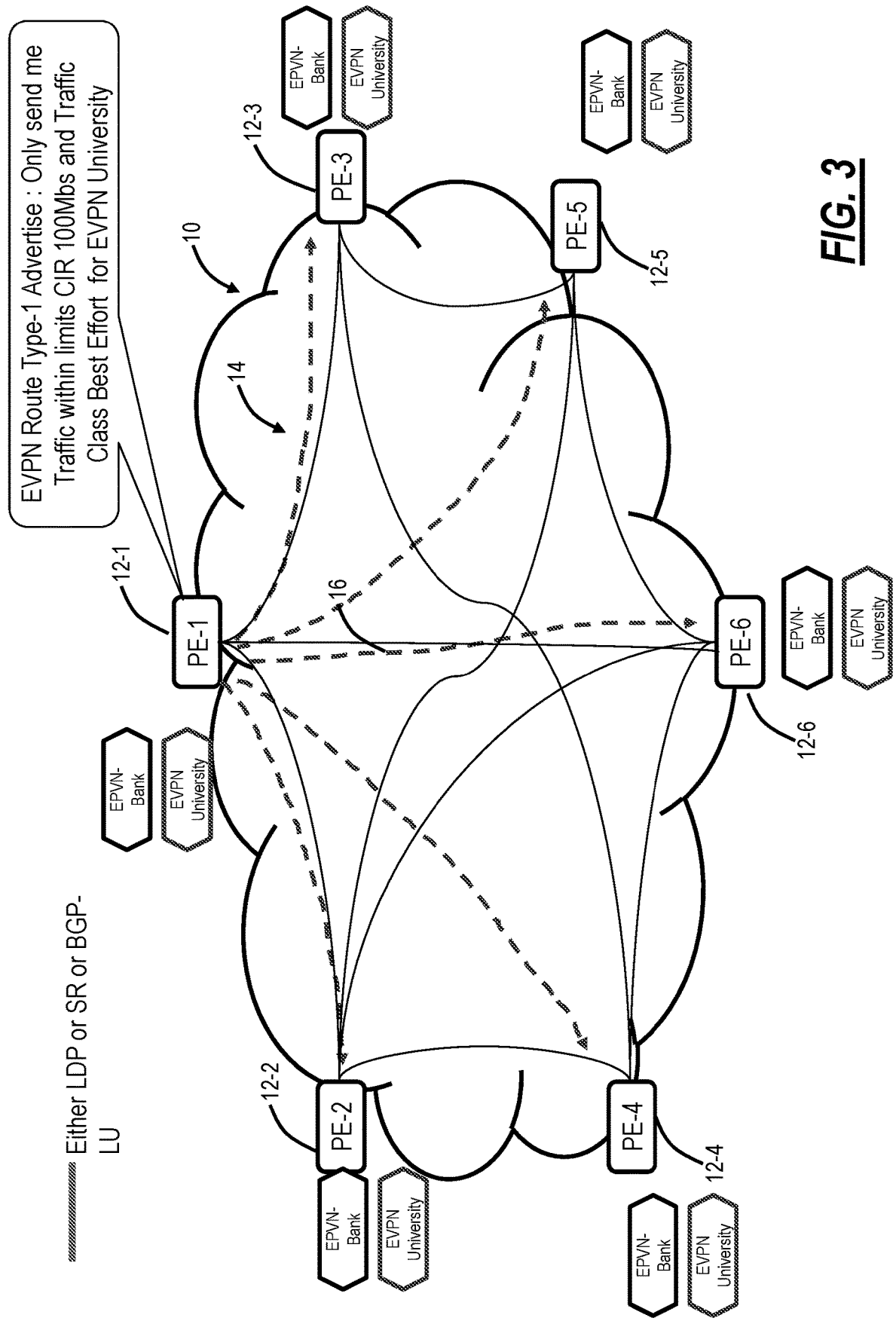
FIG. 3 is a network diagram of the network of FIG. 1 with the EVPN illustrating a first PE advertising the BGP traffic control attribute to its peer PEs for traffic control of a whole EVI.

FIG. 3 is a network diagram of the network 10 with the EVPN 14 illustrating the PE 12-1 advertising the BGP traffic control attribute 30 to its peer PEs 12-2 to 12-6 for traffic control of a whole EVI. In this example, the PE 12-1 includes the BGP traffic control attribute 30 in an EVPN Route Type-1 advertisement to only send the PE 12-1 traffic within limits of CIR 100 Mbps and traffic class Best Effort for the EVPN university.

Use Case—Traffic Control for a Specific MAC on a PE on an EVI

Figure 4:
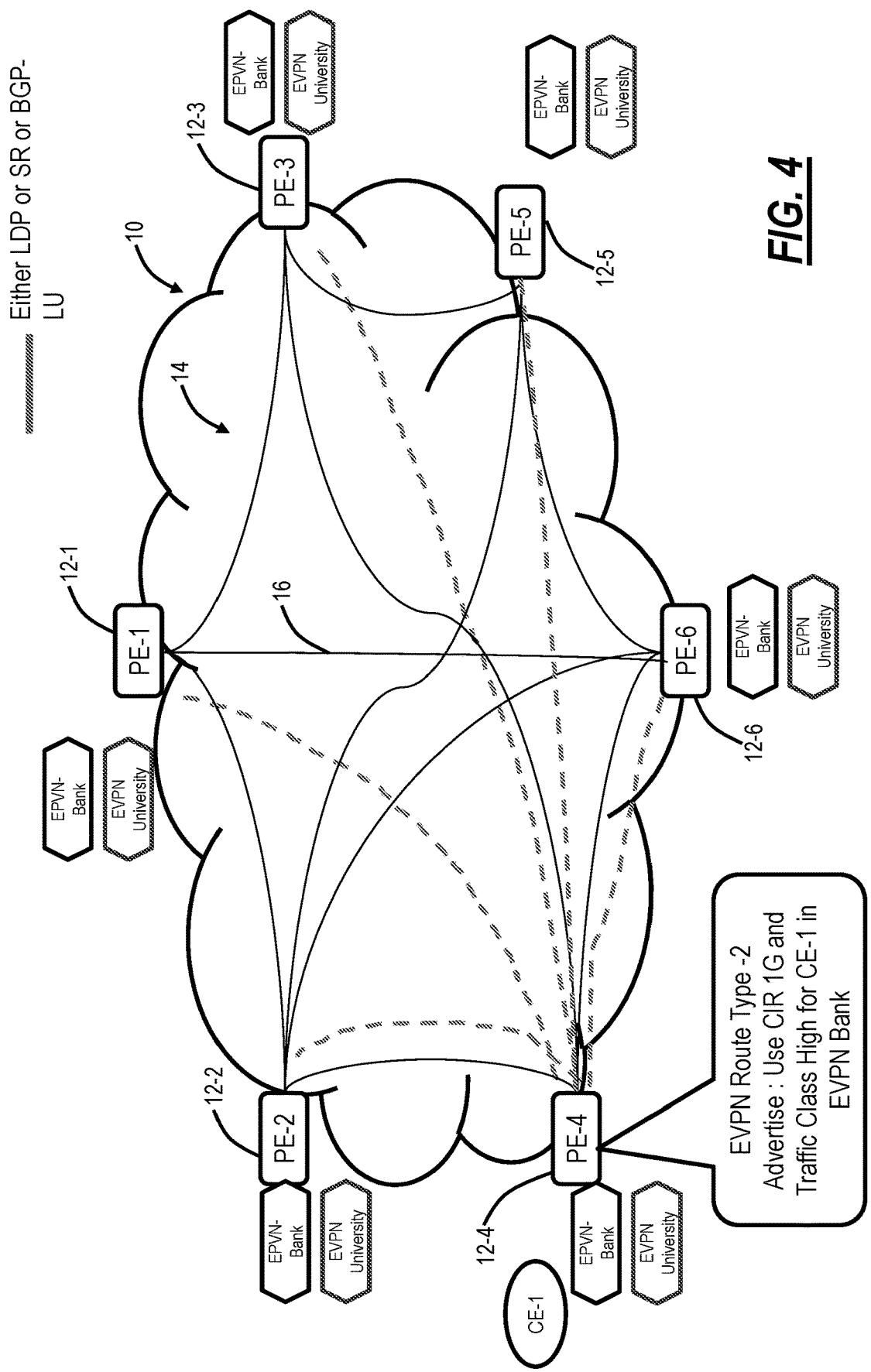
FIG. 4 is a network diagram of the network of FIG. 1 with the EVPN illustrating a PE advertising the BGP traffic control attribute to its peer PEs for traffic control for a specific MAC on an EVI.

FIG. 4 is a network diagram of the network 10 with the EVPN 14 illustrating the PE 12-4 advertising the BGP traffic control attribute 30 to its peer PEs 12-1, 12-2, 12-3, 12-5, 12-6 for traffic control for a specific MAC on an EVI. Here, in this example, the PE 12-4 includes the BGP traffic control attribute 30 in an EVPN Route Type-2 advertisement to send the PE 12-4 a CIR of 1 Gbps and traffic class High for a CE-1 associated with the EVPN bank.

Flexible Control Process for an EVPN

Figure 5:
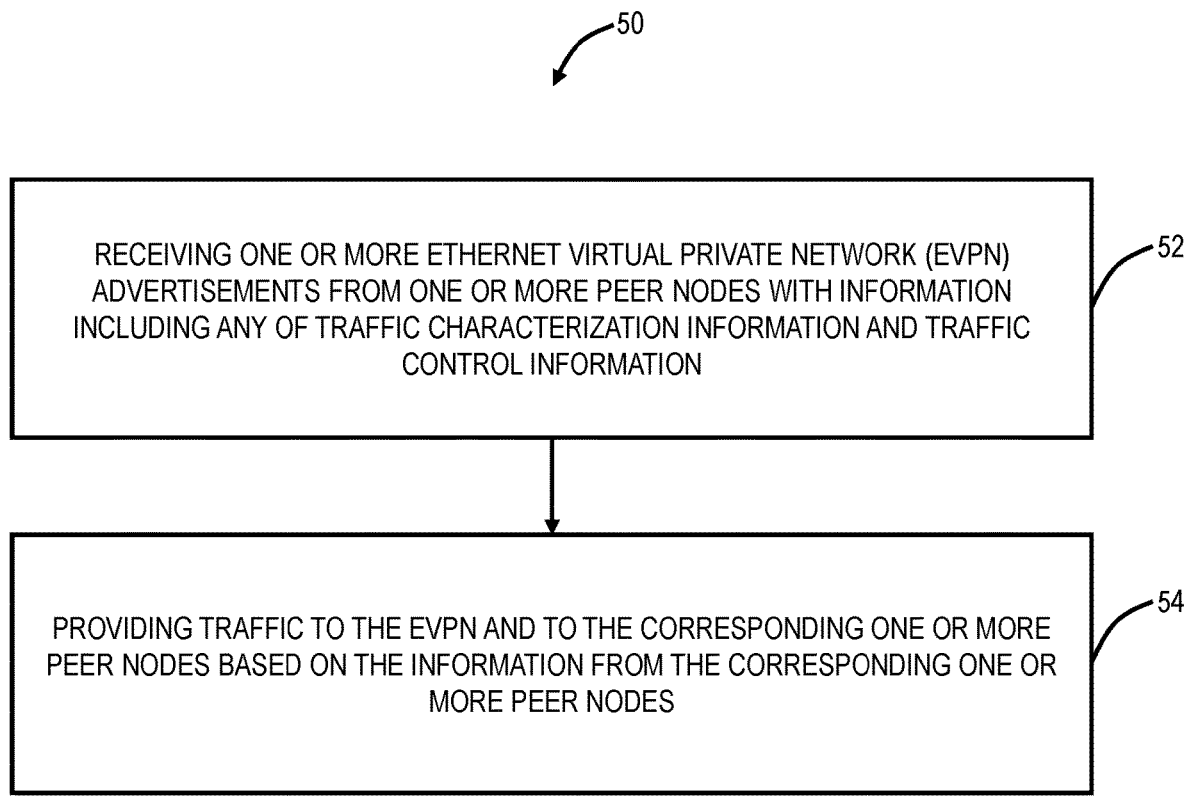
FIG. 5 is a flowchart of a flexible control process for an EVPN.

FIG. 5 is a flowchart of a flexible control process 50 for an EVPN. The flexible control process 50 contemplated implementation as a method, via a node (e.g., one of the PEs 12), and as instructions stored on a non-transitory computer-readable medium for programming a node. The flexible control process 50 includes receiving one or more Ethernet Virtual Private Network (EVPN) advertisements from one or more peer nodes with information including any of traffic characterization information and traffic control information (step 52); and providing traffic to the EVPN and to the corresponding one or more peer nodes based on the information from the corresponding one or more peer nodes (step 54).

The one or more EVPN advertisements can be in an EVPN Network Layer Reachability Information (NLRI) advertisement with Route Type 1, and the information can be applied to an EVPN Instance (EVI) associated with the EVPN NLRI advertisement. The one or more EVPN advertisements can be in an EVPN Network Layer Reachability Information (NLRI) advertisement with Route Type 2, and the information can be applied to a specific customer node based on a Media Access Control (MAC) address associated with the EVPN NLRI advertisement.

The one or more EVPN advertisements can be in an EVPN Network Layer Reachability Information (NLRI) advertisement, and the EVPN NLRI can have Route Type 1 for the information to apply to an EVPN Instance (EVI) and the EVPN NLRI can have Route Type 2 for the information to apply to a specific customer node based on a Media Access Control (MAC). The one or more EVPN advertisements can be in an optional Border Gateway Protocol (BGP) attribute. The traffic characterization information can include any of Committed Information Rate (CIR), Excess Information Rate (EIR), and Committed Burst Size (CBS). The traffic control information can include any of Traffic Class and Drop Precedence.

Example Node

Figure 6:
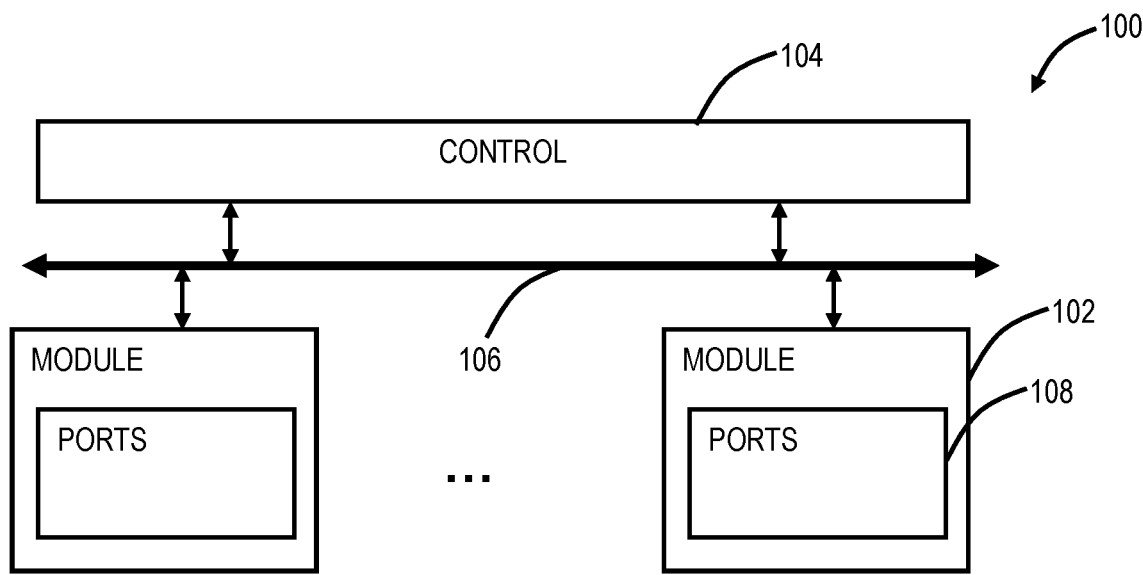
FIG. 6 is a block diagram of an example implementation of a node, such as for the PEs in the network of FIG. 1.

FIG. 6 is a block diagram of an example implementation of a node 100, such as for the PEs 12 in the network 10. Those of ordinary skill in the art will recognize FIG. 6 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 6 is meant to provide a functional view, and those of ordinary skill in the art will recognize actual hardware implementations may vary.

Example Controller

Figure 7:
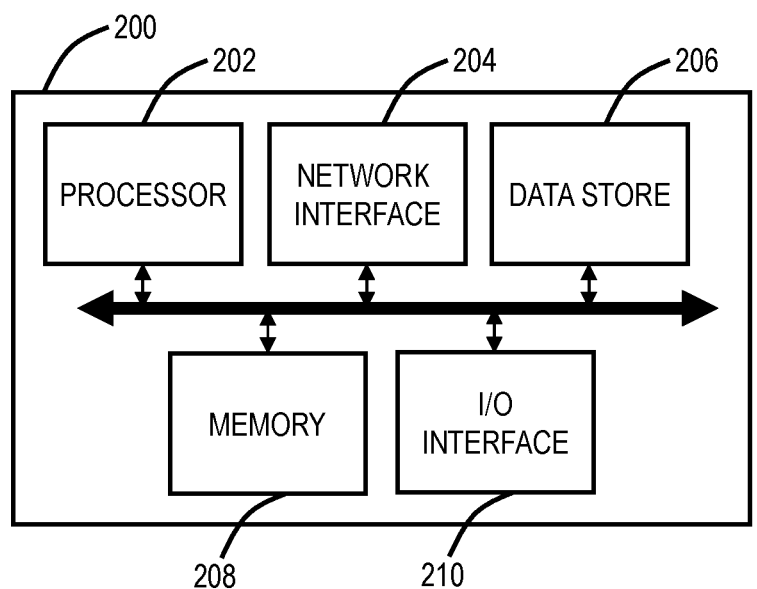
FIG. 7 is a block diagram of an example controller, which can form a controller for the node of FIG. 6.

FIG. 7 is a block diagram of an example controller 200, which can form a controller for the node 100. The controller 200 can be part of the node 100, or a stand-alone device communicatively coupled to the node 100. Also, the controller 200 can be referred to in implementations as a control module, a shelf controller, a shelf processor, a system controller, etc. The controller 200 can include a processor 202, which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 100, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node comprising:
a plurality of ports connected to one or more customer nodes and to one or more peer nodes;
a switching fabric configured to switch traffic between the plurality of ports; and
a controller configured to
obtain one or more Ethernet Virtual Private Network (EVPN) advertisements from the one or more peer nodes for an EVPN with information including traffic characterization information and traffic control information that includes Traffic Class and Drop Precedence, and
cause transmission of the traffic to the EVPN and to the corresponding one or more peer nodes based on the information from the corresponding one or more peer nodes,
wherein the one or more EVPN advertisements are in an EVPN Network Layer Reachability Information (NLRI) advertisement, and wherein the EVPN NLRI has Route Type 1 for the information to apply to an EVPN Instance (EVI) and the EVPN NLRI has Route Type 2 for the information to apply to a specific customer node based on a Media Access Control (MAC), and
wherein the information is used for policing and shaping on any of a EVI basis and a per MAC and per EVI basis.

2. The node of claim 1, wherein the one or more EVPN advertisements are in an optional Border Gateway Protocol (BGP) attribute.

3. The node of claim 1, wherein the traffic characterization information includes any of Committed Information Rate (CIR), Excess Information Rate (EIR), and Committed Burst Size (CBS).

4. A non-transitory computer-readable medium having instructions stored thereon for programming one or more processors in a node to perform steps of:
receiving one or more Ethernet Virtual Private Network (EVPN) advertisements from one or more peer nodes for an EVPN with information including traffic characterization information and traffic control information that includes Traffic Class and Drop Precedence; and
providing traffic to the EVPN and to the corresponding one or more peer nodes based on the information from the corresponding one or more peer nodes,
wherein the one or more EVPN advertisements are in an EVPN Network Layer Reachability Information (NLRI) advertisement, and wherein the EVPN NLRI has Route Type 1 for the information to apply to an EVPN Instance (EVI) and the EVPN NLRI has Route Type 2 for the information to apply to a specific customer node based on a Media Access Control (MAC), and
wherein the information is used for policing and shaping on any of a EVI basis and a per MAC and per EVI basis.

5. The non-transitory computer-readable medium of claim 4, wherein the one or more EVPN advertisements are in an optional Border Gateway Protocol (BGP) attribute.

6. The non-transitory computer-readable medium of claim 4, wherein the traffic characterization information includes any of Committed Information Rate (CIR), Excess Information Rate (EIR), and Committed Burst Size (CBS).

7. A method comprising:
receiving one or more Ethernet Virtual Private Network (EVPN) advertisements for an EVPN from one or more peer nodes with information including traffic characterization information and traffic control information that includes Traffic Class and Drop Precedence; and
providing traffic to the EVPN and to the corresponding one or more peer nodes based on the information from the corresponding one or more peer nodes
wherein the one or more EVPN advertisements are in an EVPN Network Layer Reachability Information (NLRI) advertisement, and wherein the EVPN NLRI has Route Type 1 for the information to apply to an EVPN Instance (EVI) and the EVPN NLRI has Route Type 2 for the information to apply to a specific customer node based on a Media Access Control (MAC), and wherein the information is used for policing and shaping on any of a EVI basis and a per MAC and per EVI basis.

8. The method of claim 7, wherein the one or more EVPN advertisements are in an optional Border Gateway Protocol (BGP) attribute.

9. The method of claim 7, wherein the traffic characterization information includes any of Committed Information Rate (CIR), Excess Information Rate (EIR), and Committed Burst Size (CBS).

* * * * *